Feb. 18, 1936.  F. M. SMITH  2,031,181
TRUCK
Filed Sept. 24, 1934
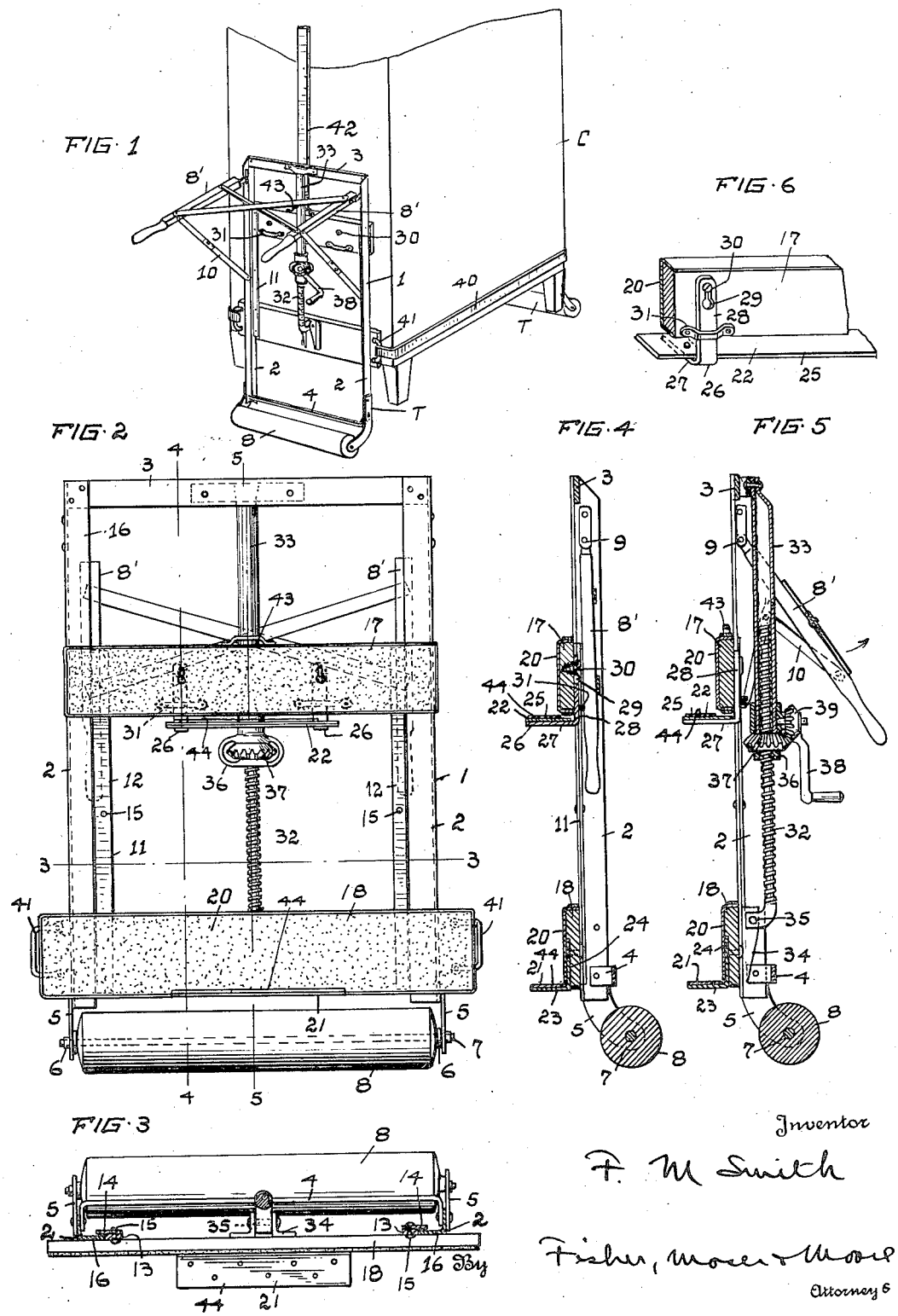
Inventor
F. M. Smith
Fisher, Moser & Moore
Attorneys Patented Feb. 18, 1936

2,031,181

UNITED STATES PATENT OFFICE 2,031,181

TRUCK

Francis M. Smith, Ashland, Ohio

Application September 24, 1934, Serial No. 745,317

9 Claims. (Cl. 254—7)

My invention relates to trucks and more particularly to that type of truck adapted for handling heavy objects such as refrigerator cabinets, stoves and the like.

The general object of the invention is to provide a truck which is easy to apply, prevents damage to floors and to articles being moved and economizes in time and labor.

Other objects and advantages of the invention will be apparent from the following specification considered in connection with the accompanying drawing, in which:

Figure 1 is a perspective view showing two trucks according to the invention supporting opposite sides of a refrigerator and their interconnection;

Figure 2 is a front elevation of one of the trucks shown in Figure 1;

Figure 3 is a cross sectional view on line 3—3 of Figure 2;

Figure 4 is a transversal sectional view on line 4—4 of Figure 2;

Figure 5 is a transversal sectional view on line 5—5 of Figure 2; and

Figure 6 is an enlarged fragmentary view of one of the slidable frame cross members of the truck having its load support removably attached thereto.

Referring more particularly to the drawing 1 denotes a truck comprising a main frame having its angle iron side members 2, connected at their upper ends by a flat cross bar 3, and at their lower ends by a U-shaped rod 4, all of said frame parts being suitably bolted or riveted together. Rearwardly curved straps or brackets 5 secured to the lower end of the side members 2, and extending downwardly and rearwardly therefrom, are provided with bearings 6 for the shaft 7 of an elongated roller 8. A pair of foldable handles 8', pivoted to the side members at 9, and also pivotally connected to a pair of links 10, in turn pivoted to each other and to members 2, afford convenient means for pushing or pulling the truck across the floor. The handles may be folded against the frame when not in use.

Mounted on the main frame 1 for vertical sliding movement is a sliding frame 11 comprising vertical side members 12 each of which consists of a narrow front metal strip 13 and a somewhat wider rear strip 14 superposed thereupon and connected thereto by bolts or other suitable fastenings 15. The outer edges of strips 14 overlap and frictionally engage the inturned flanges 16 of side members 2 of main frame 1, while upper and lower transverse members 17 and 18 respectively, secured to the upper and lower ends of side members 12 of the sliding frame 11, overlap and frictionally engage the said inturned flanges 16 of said side members 2, thus providing for free vertical sliding movement of frame 11 with respect to the main frame. The transverse members 17 and 18, preferably covered with felt or other padding 20, carry supports 22 and 21 respectively, adapted for engagement beneath refrigerator cabinets, stoves or similar articles, the bodies of which are supported either upon or at various elevations above the floor. Thus lower support 21 is designed to engage beneath the body of a refrigerator, whereas support 22 is approximately the right height to engage beneath a stove or the like whose body is supported upon relatively long legs.

Load support 21 is formed of a relatively short length of angle iron 23, the vertical portion 24 of which is bolted or otherwise suitably fastened to cross member 18, while load support 22 consists of a flat metal strip 25. As the upper support 22 must be removed when support 21 is being utilized, it is essential that the former be readily detachable. This is accomplished by means of a pair of angle brackets 26, the horizontally disposed arms 27 of which are bolted or otherwise permanently attached to the bottom of strip 25. The vertical arms 28 of these brackets are formed with bayonet slots 29 adapted to receive headed screws 30 projecting from the outer face of upper cross member 17 of sliding frame 11, thus providing for quick assembly or disassembly.

In order to secure the strip 25 to the sliding frame, the free ends of arms 28 are inserted upwardly through retaining straps 31, secured to the back of cross member 17, until the enlarged lower portion of bayonet slots 29 register with the heads of screws 30. A slight inward tilting movement will then permit of the brackets dropping into locked position, the straps 31 being sufficiently close to the lower edge of and spaced from member 17 to permit of the necessary tilting movement.

The means employed for elevating and lowering the sliding frame 11, comprises a pair of telescopic jack elements, namely, a screw 32 and a hollow tubular guide member 33. Screw 32 is connected at its lower offset end to spaced apertured brackets 34, by means of pivot pin 35, the brackets in turn being bolted to the rear face of cross member 18. Tubular guide member 33 is riveted to the cross strip 3 of main frame 1, at its upper end and carries a yoke 36 at its lower end in which a bevel gear 37 is mounted for free rotary movement. The screw 32 extends threadedly through the gear 37 into the tubular guide member. When the gear 37 is rotated by means of a handle 38, pivotally mounted on the yoke and formed with a gear 39, in mesh with gear 37, the sliding frame 11 together with cabinet C supported thereon will be elevated or lowered according to the direction of rotation of gear 37.

While the telescopic jack members, screw 32 and tubular guide member 33, are secured to the top of the main frame 1 and to the lower end of sliding frame 11 in alinement with each other, the pivotal mounting of screw 32 compensates for any slight mis-alinement thus greatly facilitating assembly in addition to assuring smoothness of operation. It will of course be understood that two trucks T are employed at opposite sides of the cabinet C or other article to be transported and that the cabinet will be supported upon and between the trucks.

The lower ends of the two trucks T are secured to each other and to the cabinet C by means of straps or ropes 40, the opposite ends of which are fastened to eye members 41 mounted upon and projecting from opposite ends of lower cross member 18 of each truck. A third strap 42 is passed over the top of cabinet C and connected at its ends to eye members 43 carried by the upper cross members 17. Supports 22 and 21 carried by the cross members 17 and 18 are preferably covered with a cushioning and protective strip 44 of rubber or the like.

The use of a full length roller 8 as distinguished from the customary casters or wheels facilitates loading or unloading articles on or from wagons and also prevents injury to smooth floors. Furthermore the roller, being offset to one side of the main frame, cooperates with the lower end of the sliding frame and the load support 21 of the latter on the other side of the main frame, in supporting the truck in upright position, when the sliding frame is in lowered position. This offset arrangement of roller also tends to cause the trucks T to tilt towards each other under load.

Having thus described my invention, what I claim is:

1. A truck for handling heavy objects comprising a main frame having laterally spaced side members, a second frame slidably engaged with the side members of said main frame having padded cross members extended across the front face of said side members, vertically arranged means interconnecting said main frame and said second frame for shifting said second frame with respect to said main frame and vertically spaced load supporting means on said second frame, the upper load supporting means being removably supported on said second frame.

2. A truck for handling heavy objects comprising a main frame having laterally spaced side members, a second frame slidably engaged with the side members of said main frame, vertically arranged telescoped screw means interconnecting opposite ends of said main frame and said second frame for shifting said second frame with respect to said main frame and vertically spaced load supporting means on said second frame, the upper one of said load supporting means being removably supported on said second frame.

3. A truck for handling heavy objects as described in claim 1 provided with an elongated roller arranged between and supported by the lower ends of the said side members, the axis of said roller being rearwardly offset with respect to said side members.

4. A truck for handling heavy objects as described in claim 2 wherein the screw means embody a screw member pivotally secured to the lower cross member and a nut supporting member rigidly secured to the upper end of said main frame.

5. A truck for handling heavy objects comprising a main frame having laterally spaced angular side members, a second frame slidably interengaged with the inwardly extending flanges of said side members, said second frame having two padded cross members extending across the face of said flanges, vertically arranged telescoped screw means connecting with said main frame and with one of the cross members at said second frame for shifting said second frame with respect to said main frame, and a removable load support on the other of said cross members.

6. A truck for handling heavy objects as described in claim 5 wherein the removable load support embodies brackets having vertical portions slidably engaged with and suspended from said supporting means on the other of said cross members.

7. A truck comprising a main frame, a roller of substantial width supporting said frame, a second frame slidably arranged within said main frame, and a plurality of load supporting means on said second frame, said load supporting means being arranged above each other and one of said load supporting means being removably secured to said second frame to permit selective use of said supporting means.

8. In a truck embodying a main frame and a second frame provided with a cross piece and slidably supported by said main frame, removable load supporting means secured to said cross piece of said second frame, said supporting means embodying brackets having vertical portions slidably arranged with respect to and suspended from the cross piece of said second frame, and said cross piece embodying guide means for preventing tilting of said supporting means when suspended from said cross piece.

9. In a truck according to claim 8 guide means comprising brackets attached to the cross piece of said second frame close to the edge thereof to permit tilting of said vertical portions of said brackets for assembly and disassembly purposes.

FRANCIS M. SMITH.